United States Patent
Weirich

(10) Patent No.: US 12,338,726 B2
(45) Date of Patent: Jun. 24, 2025

(54) ENGINEERED ACOUSTICS FOR DOWNHOLE EQUIPMENT

(71) Applicant: Chevron U.S.A. Inc., San Ramon, CA (US)

(72) Inventor: John B. Weirich, Spring, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/470,205

(22) Filed: Sep. 19, 2023

(65) Prior Publication Data
US 2025/0092775 A1    Mar. 20, 2025

(51) Int. Cl.
| E21B 47/00 | (2012.01) |
| E21B 34/14 | (2006.01) |
| E21B 41/00 | (2006.01) |
| G01H 9/00  | (2006.01) |

(52) U.S. Cl.
CPC .............. *E21B 47/00* (2013.01); *E21B 34/14* (2013.01); *E21B 41/0085* (2013.01); *G01H 9/004* (2013.01)

(58) Field of Classification Search
CPC ........ E21B 43/14; E21B 43/12; E21B 34/066; E21B 47/06; E21B 2200/02; E21B 47/12; E21B 47/01; E21B 47/16; E21B 34/14; E21B 34/06
See application file for complete search history.

(56) References Cited

U.S. PATENT DOCUMENTS
2022/0065818 A1 * 3/2022 Werkheiser ........ G01N 15/0806

FOREIGN PATENT DOCUMENTS
| CA | 2455101 C * | 11/2008 | ............. E21B 34/14 |
| WO | WO-2017200523 A1 * | 11/2017 | ............. E21B 34/14 |

OTHER PUBLICATIONS

NBG Custom Fiber Optic Solutions; 8 Benefits of Distributed Acoustic Sensing (DAS) in the Oil & Gas Industry; Apr. 17, 2023; www.nbg.tech/8-benefits-of-distributed-acoustic-sensing-das-in-the-oil-gas-industry/.
Silixa; Distributed Fibre Optic Sensing Systems & Solutions; Apr. 17, 2023; https://silixa.com.

* cited by examiner

*Primary Examiner* — Zakiya W Bates
(74) *Attorney, Agent, or Firm* — King & Spalding LLP

(57) ABSTRACT

Downhole equipment in a well includes an acoustic feature that emits an acoustic signal providing an indication of the operation of the downhole equipment. The downhole equipment is placed, above, below, or around a tubing string, or elsewhere in the well. The downhole equipment can include a flow control valve, a housing assembly, a sand screen assembly, or a base pipe. The acoustic feature can be a protrusion and notch that engage and generate the acoustic signal. Alternatively, a moving component such as a turbine can be included in the downhole equipment and can generate the acoustic signal when the component moves. Alternatively, the acoustic feature can be any device that emits a unique acoustic signal.

12 Claims, 5 Drawing Sheets

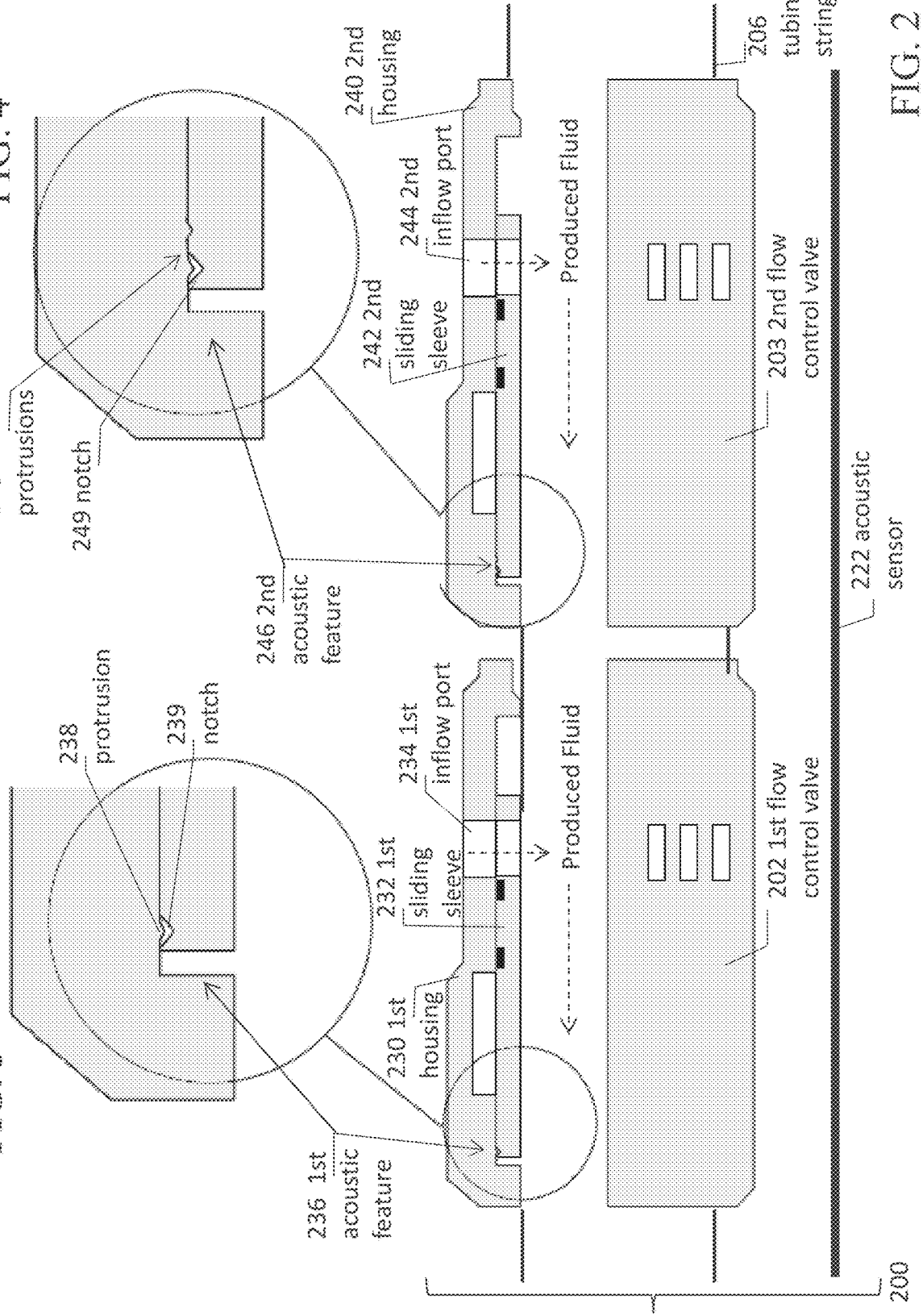

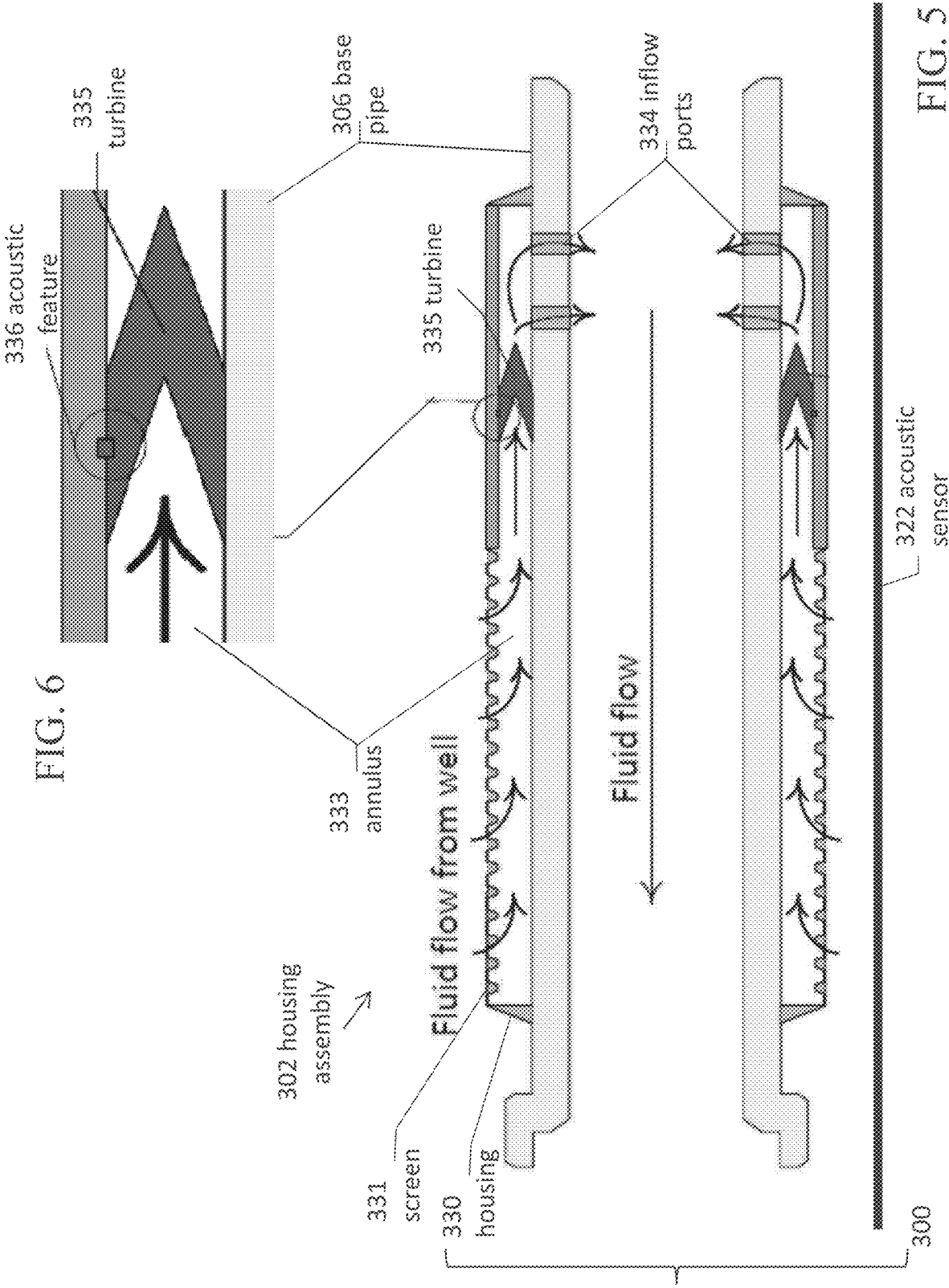

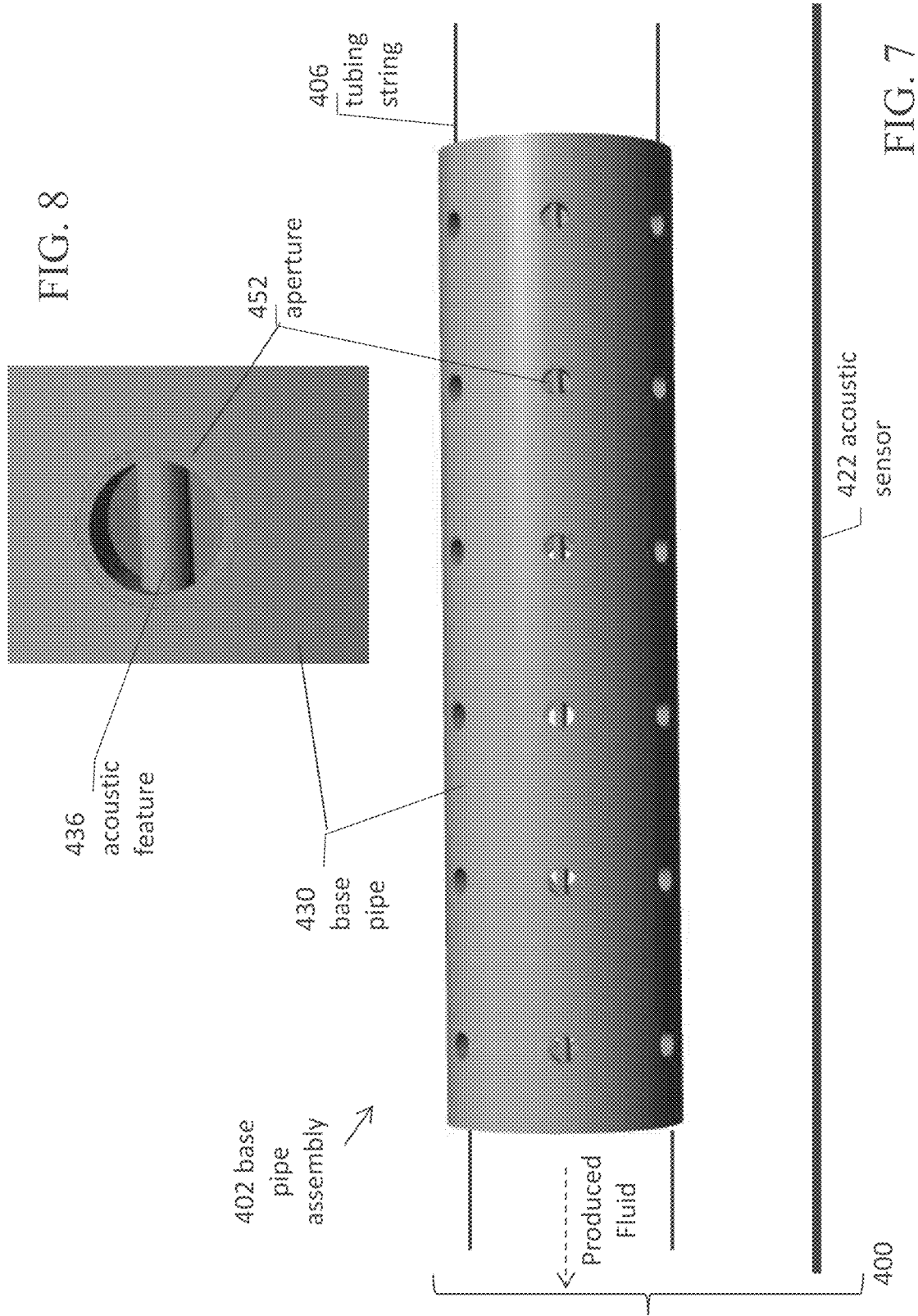

ENGINEERED ACOUSTICS FOR DOWNHOLE EQUIPMENT

TECHNICAL FIELD

Embodiments of the technology relate generally to engineering acoustic features into downhole equipment for collecting information about operations in a wellbore.

BACKGROUND

Wells are drilled into land and subsea formations in order to produce resources such as water and hydrocarbons (e.g., oil and natural gas) from a reservoir in the formation. Once a well has been drilled, the well must be completed before a resource can be produced from the well. A completion involves the design, selection, and installation of equipment and materials in or around the wellbore for conveying, pumping, or controlling the production of fluids from the well or the injection of fluids into the well. After the well has been completed, production of the resources from the well can begin.

Managing the operation and performance of the downhole equipment in a wellbore can be challenging given the restricted space within a wellbore and the depths within the wellbore at which the equipment is placed. There are a variety of existing techniques for collecting information concerning the operation and performance of downhole equipment in a wellbore. Such techniques include production logging tools, weight indications, pressure indications, or movement indications to infer measurements or actuation within the wellbore. However, these existing techniques are often imprecise or inconclusive. Furthermore, in certain types of wells these existing techniques are impractical.

Therefore, techniques that provide further insights into the operation and performance of downhole equipment in a wellbore would be beneficial. Improvements in managing the operation and performance of downhole equipment in a wellbore can facilitate more efficient operation of the well and production of resources from the well. The following disclosure provides techniques for gathering information regarding the operation and performance of downhole equipment in a wellbore.

SUMMARY

The present disclosure is directed to techniques for using acoustic features to gather information regarding the operation and performance of downhole equipment in a wellbore. In one example embodiment, a well system comprises: a tubing string disposed in a wellbore; an acoustic sensor disposed in the wellbore adjacent to the tubing string; and a flow control valve disposed in the wellbore and surrounding a portion of the tubing string, the flow control valve comprising a housing, a sliding sleeve, and an acoustic feature disposed on one or both of the housing and the sliding sleeve. When the sliding sleeve moves from a first position to a second position, the acoustic feature emits an acoustic signal that is detectable by the acoustic sensor.

In another example embodiment, a well system comprises: a base pipe disposed in a wellbore; an acoustic sensor disposed in the wellbore adjacent to the base pipe; and a housing assembly disposed in the wellbore and surrounding a portion of the base pipe. The housing assembly comprises: a housing, a turbine disposed between the housing and the base pipe, and an acoustic feature, wherein when the turbine rotates the acoustic feature emits an acoustic signal that is detectable by the acoustic sensor.

In yet another example embodiment, a well system comprises: a tubing string disposed in a wellbore; an acoustic sensor disposed in the wellbore adjacent to the tubing string; and a base pipe assembly disposed in the wellbore and attached to the tubing string. The base pipe assembly comprises a base pipe, a plurality of apertures, and an acoustic feature. When fluid flows through an aperture of the plurality of apertures the acoustic feature emits an acoustic signal that is detectable by the acoustic sensor.

In yet another example embodiment, a method of managing a well system comprises: placing downhole equipment in a wellbore of the well system, the downhole equipment comprising an acoustic feature; detecting with an acoustic sensor an acoustic signal emitted by the acoustic feature of the downhole equipment; transmitting, by the acoustic sensor, the acoustic signal to a control system; determining, by the control system, an operating parameter of the downhole equipment based upon the acoustic signal; and transmitting, by the control system, responsive to determining the operating parameter, a control signal that modifies an operation of the well system.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of apparatus and methods for downhole equipment with engineered acoustic features and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

FIG. 2 illustrates flow control valves that can be used in a field system in accordance with an example embodiment of the disclosure.

FIG. 3 and FIG. 4 provide enlarged views of portions of the example flow control valves illustrated in FIG. 2.

FIG. 5 illustrates a sand screen that can be used in a field system in accordance with an example embodiment of the disclosure.

FIG. 6 provides an enlarged view of a portion of the example sand screen illustrated in FIG. 5.

FIG. 7 illustrates another example sand screen that can be used in a field system in accordance with an example embodiment of the disclosure.

FIG. 8 provides an enlarged view of a portion of the example sand screen illustrated in FIG. 7.

DETAILED DESCRIPTION OF EXAMPLE EMBODIMENTS

The example embodiments discussed herein are directed to apparatus and methods for downhole equipment that have engineered acoustic features. The example embodiments described herein can facilitate the collection of information about the operation of the downhole equipment that is placed in wellbore. The example embodiments can improve upon prior approaches to managing downhole equipment by providing more timely, localized, reliable, and accurate information about the operation of downhole equipment in a wellbore.

The example embodiments described herein provide downhole equipment with an acoustic feature engineered into the equipment. The acoustic feature generates an acoustic signal providing an indication of the operation or performance of the downhole equipment. The indication can relate to any of a variety of properties, including flow of fluid, position of equipment, or actuation of equipment. The acoustic signal can be detected by a downhole acoustic sensor and transmitted to the surface where the detected acoustic signal can be used in managing the operation of the equipment.

Because the acoustic feature is engineered into the downhole equipment rather than being inherent or consequential, the acoustic signal it generates is unique and localized to the equipment, thereby providing a more timely, accurate, and reliable indication relating to the operation of the downhole equipment. Additionally, the techniques described herein can be less costly and less complicated than prior approaches to monitoring downhole equipment. Therefore, the example embodiments described herein can provide improved techniques for monitoring and managing the operation and performance of equipment located in a wellbore. As will be described further in the following examples, the methods and apparatus described herein improve upon prior art approaches to managing downhole equipment.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
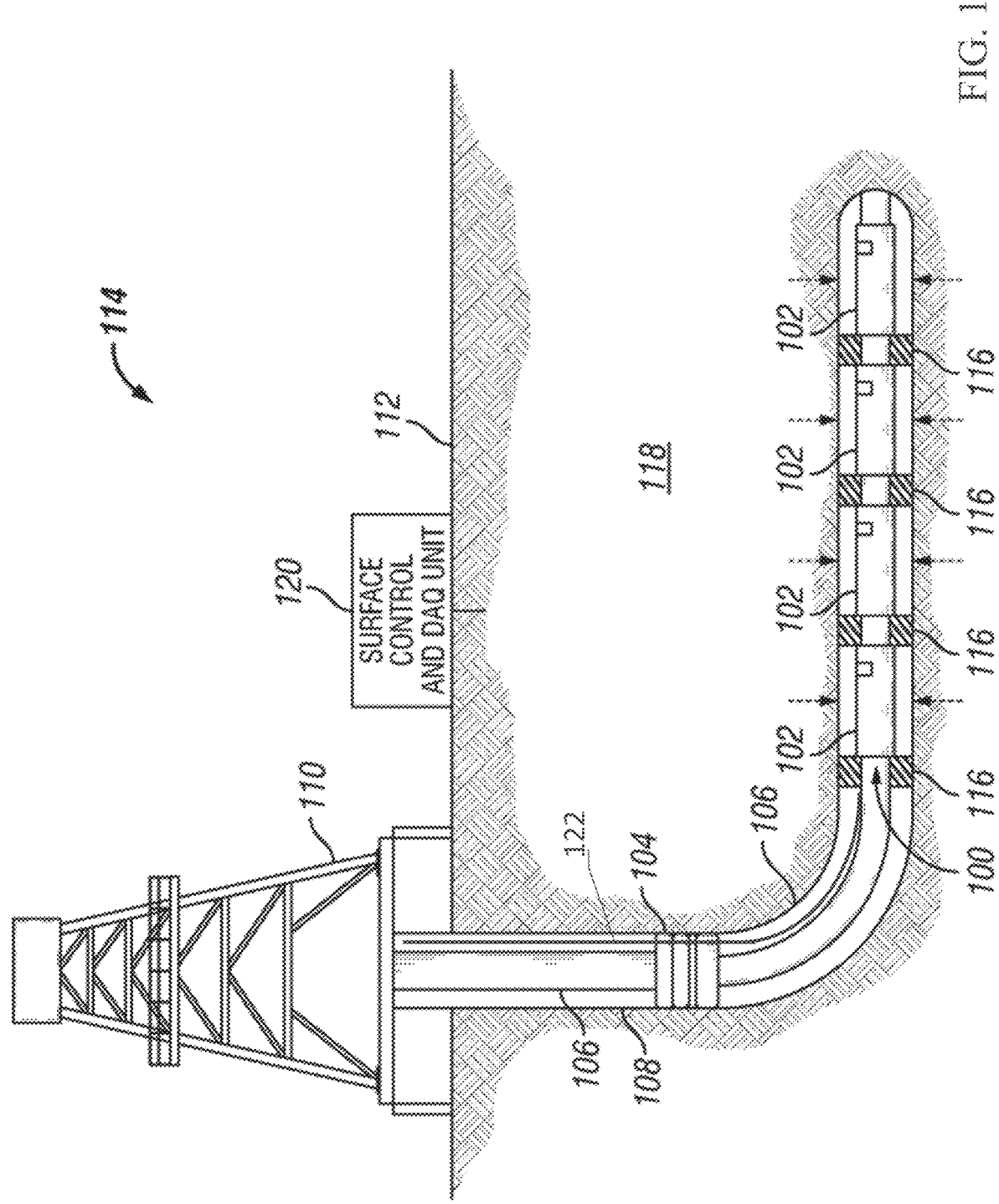
FIG. 1 is a cross-sectional schematic illustration of a field system with a wellbore drilled into a formation in accordance with an example embodiment of the disclosure.

Referring to FIG. 1, a schematic diagram is shown providing a cross-section of a field system for producing a resource from a reservoir in an underground or subsea formation. Specifically, a wellsite 114 with downhole equipment is illustrated in FIG. 1. The example wellsite 114 in the field system of FIG. 1 includes a horizontal wellbore 108. The field system and wellsite 114 of FIG. 1 are simply one example illustrating the implementation of the engineered acoustic features described herein. The acoustic sensing techniques described herein can be applied in a variety of vertical, horizontal, and slanted production and injection wells.

The wellbore 108 is formed in a subterranean formation 118 and coupled to a platform 110 on a surface 112 of the formation 118. The formation 118 can include one or more of a number of formation types, including but not limited to shale, limestone, sandstone, clay, sand, and salt. The surface 112 may be ground level for an on-shore application or the sea floor for an off-shore application. In certain embodiments, a subterranean formation 118 can also include one or more reservoirs in which one or more resources (e.g., oil, gas, water, steam) are located. In certain example embodiments, the wellbore 108 is cased with cement or other casing material, which is perforated to allow fluids to flow from the formation 118 into the well 108. In other example embodiments, the techniques described herein can be applied to other wellbore configurations such as open hole wells where no casing is present.

A tubing string 106 is disposed downhole within the wellbore 108. Fluids are recovered from reservoirs in the formation and brought to the surface 110 through the tubing string 106. In certain example embodiments, a production packer 104 is coupled to the tubing string 106. A variety of downhole equipment can be placed within the wellbore 108 to complete operations associated with the well. As will be described further in connection with the examples illustrated in FIGS. 2-8, downhole equipment with engineered acoustic features can include flow control valves. sand screen assemblies, base pipe assemblies, and a variety of housings and other downhole equipment. In other types of wells, such as injection wells, other types of downhole equipment having engineered acoustic features can be placed in the well.

Referencing the example wellsite 114 of FIG. 1, a production control system 100 can include one or more production control units 102 coupled to the tubing string 106 at various linear portions along the tubing string 106. The production control units 102 can include one or more of a flow control valve and a sand screen assembly. The production control units 102 can control the flow of fluid from the wellbore 108 or formation 118 into the tubing string 106. In certain example embodiments, a packer 116 is placed between each production control unit 102, thereby isolating each respective portion of the wellbore 108. The placement of the production control units 102 and the packers 116 separates the wellbore 108 into one or more well zones, which can be configured to independently control the flow of fluids from the reservoir into the tubing string at its respective zone.

Also disposed in the wellbore 108 is an acoustic sensor 122. The acoustic sensor 122 can take a variety of forms including a microphone and/or a fiber optic acoustic sensor. The acoustic sensor 122 is placed along the length of the wellbore 108. The acoustic sensor 122 can be attached to a face of the wellbore, can be attached to a casing within the wellbore 108, can be attached to the tubing string 106 or other equipment in the wellbore 108, or can simply extend into the wellbore unattached to surfaces within the wellbore 108. The acoustic sensor 122 can detect acoustic signals from the acoustic features engineered into the downhole equipment and can transmit the detected acoustic signals to the surface 112 for use in managing the operation of the wellsite 114.

In certain example embodiments, there is a surface control center located aboveground, which allows operators of the wellsite 114 to monitor and control the production control system 100. The surface control center includes a surface control and data acquisition (DAQ) unit 120 that can receive the acoustic signals detected from the downhole equipment by the acoustic sensor 122. The surface control and data acquisition unit 120 can process the received acoustic signals and make determinations regarding the operation of the downhole equipment. In response to processing the received acoustic signals and making determinations regarding the downhole equipment, the surface control and data acquisition unit 120 is configured to communicate with the production control system 100 and to send control signals to the production control system 100 regarding operation of the production control units 102. In certain example embodiments, the surface control and data acquisition unit 120 receives control inputs from an operator and transmits corresponding control signals to the production control system 100.

Referring to FIGS. 2-4, one example of downhole equipment with engineered acoustic features is illustrated. Specifically, FIG. 2 shows a portion of a well system 200 with a pair of flow control valves 202 and 203 located in a wellbore. For simplicity, the wellbore is not shown in FIG. 2. The flow control valves 202 and 203 are placed on the outer surface of a tubing string 206 located in the wellbore and the flow control valves can be used to regulate the flow of a produced fluid from a reservoir into the tubing string 206. Multiple flow control valves along a length of the wellbore, such as those illustrated in FIG. 2, can be useful in controlling flow rates of a produced fluid when the wellbore passes through multiple formation zones, which may have varying flow rates. Managing the flow of a produced fluid at different rates from different formation zones can be important to the overall operating efficiency of the well. While the engineered acoustic features will be described in the operation of the pair of flow control valves illustrated in FIG. 2, in other embodiments the engineered acoustic features can be implemented in a single flow control valve or in more than two flow control valves.

The flow control valves illustrated in FIG. 2 are shown in partial cross-section in order to clearly illustrate their features. Such flow control valves can be passive or active. Active flow control valves typically are controlled by control lines (hydraulic or electric) that extend from the surface down through the wellbore to the flow control valve. The sleeve of the flow control valve is moved to adjust the size of the inflow ports to regulate the flow of the produced fluid.

Referring specifically to the features illustrated in FIGS. 2-4, the first flow control valve 202 comprises a first housing 230, a first sliding sleeve 232, and a first inflow port 234. The first sliding sleeve 232 can be controlled by sliding between a closed position that closes the first inflow port 234 and an open position (as shown in FIG. 2) that opens the first inflow port 234 and allows a produced fluid to flow into the tubing string 206. Similarly, the second flow control valve 203 comprises a second housing 240, a second sliding sleeve 242, and a second inflow port 244. The second sliding sleeve 242 can be controlled by sliding between a closed position that closes the first inflow port 244 and an open position (as shown in FIG. 2) that opens the first inflow port 244 and allows a produced fluid to flow into the tubing string 206.

The first flow control valve 202 also comprises a first acoustic feature 236 that emits an acoustic signal when the first sliding sleeve 232 moves into the open position. The first acoustic feature 236 can have a variety of configurations. In the example of FIGS. 2 and 3, the first acoustic feature 236 is implemented as a protrusion 238 extending from an inner surface of the first housing 230 and a notch 239 located on an outer surface of the first sliding sleeve 232. When the first sliding sleeve 232 slides to the open position, the protrusion 238 and the notch 239 engage and emit an acoustic signal indicating the open position of the first flow control valve 202. In other examples, the positions of the protrusion and the notch can be reversed with the protrusion located on the first sliding sleeve and the notch located on the first housing.

Similarly, the second flow control valve 203 also comprises a second acoustic feature 246 that emits an acoustic signal when the second sliding sleeve 242 moves into the open position. The second acoustic feature 246 can have a variety of configurations. In the example of FIGS. 2 and 4, the second acoustic feature 246 is implemented as two protrusions 248 extending from an inner surface of the second housing 240 and a notch 249 located on an outer surface of the second sliding sleeve 242. When the second sliding sleeve 242 slides to the open position, the protrusions 248 and the notch 249 engage and emit two acoustic signals indicating the open position of the second flow control valve 203. In other examples, the positions of the protrusions and the notch can be reversed with the protrusions located on the second sliding sleeve and the notch located on the second housing. Likewise, in other examples, a single protrusion that slides over two notches or other configurations can be implemented.

The acoustic sensor 222 disposed in the wellbore proximate to the first flow control valve 202 and the second flow control valve 203 can detect the acoustic signals emitted from the valves and can transmit the detected signals to a surface control system, such the surface control and data acquisition unit 120 of FIG. 1. As described further in connection with FIG. 9, the surface control system can process the detected acoustic signals to determine an operation parameter of the well system. For example, the single acoustic signal emitted by the first acoustic feature 236 can indicate the first flow control valve 202 is in the open position. Likewise, two acoustic signals emitted by the second acoustic feature 246 can indicate the second flow control valve 203 is in the open position. Because the detected acoustic signals are collected locally at each valve, they can provide more accurate information about the operation of the valves. Moreover, the engineered acoustic features are advantageous because other more complex or cumbersome sensing equipment is not required to monitor the operation of the valves. The surface control system can use the detected acoustic signals to generate control operations that improve the operation of the well system.

Referring now to FIGS. 5 and 6, another example of downhole equipment with engineered acoustic features is illustrated. Specifically, FIG. 5 shows in cross-section a portion of a well system 300 with a base pipe 306 and a housing assembly 302 located in a wellbore. Although not shown in FIG. 5, the base pipe can be attached to other downhole equipment including pipe sections or elements of a gravel pack. For simplicity, the wellbore is not shown in FIG. 5. The housing assembly 302 is placed on the outer surface of the base pipe 306 located in the wellbore to regulate the flow of a produced fluid from a reservoir into the base pipe 306. The housing assembly 302 can serve a variety of purposes, including being a sand screen assembly that can be useful in filtering sand and other debris from the produced fluid.

The housing assembly 302 comprises a housing 330 that is placed around the outer surface of the base pipe 306 so that an annulus 333 is formed between the outer surface of the base pipe 306 and the inner surface of the housing assembly 302. In the example of FIG. 5, the housing assembly 302 further comprises a sand screen 331 that can filter sand and debris from produced fluid as the produced fluid flows through the sand screen 331. The housing assembly 302 also comprises a turbine 335 that is disposed in the annulus 333. As the produced fluid flows through the sand screen 331 and through the annulus 333 is passes over or through the turbine 335 causing the turbine 335 to rotate. The produced fluid then continues to flow through the annulus 333 and through the inflow ports 334 of the base pipe 306 from which point it proceeds up the tubing string 306 to the surface of the well system.

As illustrated in greater detail in the enlarged portion of the housing assembly 302 provided in FIG. 6, the turbine 335 is disposed in the annulus 333 and can be secured to one or both of the inner surface of the housing assembly 302 and the outer surface of the base pipe 306. The turbine 335 further comprises an acoustic feature 336 which can have a variety of configurations. In the example of FIG. 6, the acoustic feature 336 is a tab that engages the blades of the turbine 335 as the turbine rotates. Therefore, as produced fluid flows over or through the turbine 335, the turbine blades spin engaging the acoustic feature (the tab) 336 causing an acoustic signal to be generated. The acoustic signal generated from the engagement of the tab and the turbine blades can be detected by the proximate acoustic sensor 322 located in the wellbore. The acoustic signal can serve as an indicator that a produced fluid is flowing through the sand screen assembly 302. In some examples, a frequency with which the turbine blades rotate and generate acoustic signals can provide an indication of the speed of the produced fluid flow.

The acoustic sensor 322 disposed in the wellbore proximate to the sand screen assembly 302 can transmit the detected acoustic signals to a surface control system, such as the surface control and data acquisition unit 120 of FIG. 1. The surface control system can process the detected acoustic signals to determine an operation parameter of the well system, such as the flow of produced fluid through the housing assembly 302. Because the detected acoustic signals are collected locally at the housing assembly 302, they can provide more accurate information about the operation of the well. Moreover, the engineered acoustic feature in the form of the turbine and the tab are advantageous because other more complex or cumbersome sensing equipment is not required to monitor the operation of the valves. The surface control system can use the detected acoustic signals to generate control operations that improve the operation of the well system.

Referring now to FIGS. 7 and 8, another example of a base pipe assembly with engineered acoustic features is illustrated. Specifically, FIG. 7 shows a portion of a well system 400 with a tubing string 406 and a base pipe assembly 402 located in a wellbore. For simplicity, the wellbore is not shown in FIG. 7. The base pipe assembly 402 is attached to the tubing string 406 located in the wellbore to regulate the flow of a produced fluid from a reservoir into the tubing string 406. The base pipe assembly 402 can be useful in filtering sand and other debris from the produced fluid. Although omitted from FIG. 7 for clarity, a sand screen can be attached to the outside surface of the base pipe assembly 402.

The base pipe assembly 402 comprises a base pipe 430 that is attached to the tubing string 406. The base pipe assembly 402 further comprises a plurality of apertures 452 that can filter sand and debris from produced fluid as the produced fluid flows through the base pipe assembly 402 and into inflow ports in the tubing string 406. The base pipe assembly 402 also comprises one or more acoustic features 436 that generate an acoustic signal as a produced fluid flows through the base pipe assembly 402. The acoustic feature 436 can have a variety of configurations. As illustrated in the enlarged view provided in FIG. 8, the acoustic feature 436 can be a tab extending across an aperture 452 wherein the tab generates an acoustic signal as a produced fluid flows through the aperture 452. In other embodiments, the acoustic feature 436 can have other shapes that modify the shape of the aperture 452 thereby causing an acoustic signal to be generated when a produced fluid flows through the modified aperture 452. In yet other examples, different acoustic features 436 can be implemented at different locations along the base pipe assembly 402 to indicate differing flow characteristics along the length of the base pipe assembly 402.

The acoustic sensor 422 disposed in the wellbore proximate to the base pipe assembly 402 can detect the acoustic signals generated by the one or more acoustic features 436 and can transmit the detected acoustic signals to a surface control system, such the surface control and data acquisition unit 120 of FIG. 1. The surface control system can process the detected acoustic signals to determine an operation parameter of the well system, such as the flow of produced fluid through the base pipe assembly 402. Because the detected acoustic signals are collected locally at the base pipe assembly 402, they can provide more accurate information about the operation of the well. Moreover, the engineered acoustic feature in the form of one or more tabs located in the screen apertures are advantageous because other more complex or cumbersome sensing equipment is not required to monitor the operation of the valves. The surface control system can use the detected acoustic signals to generate control operations that improve the operation of the well system.

Figure 9:
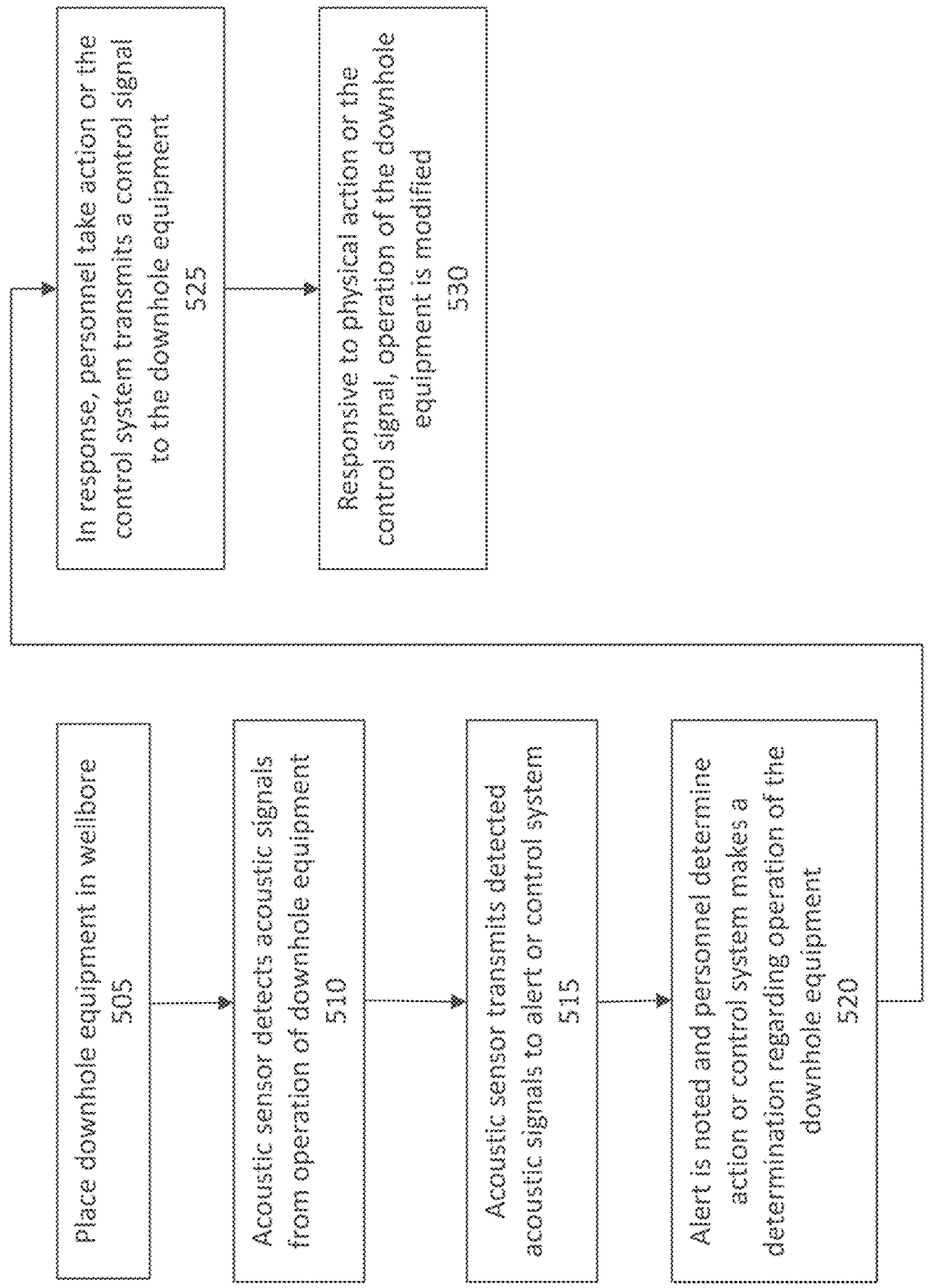
FIG. 9 illustrates an example method of operating downhole equipment with engineered acoustic features in accordance with an example embodiment of the disclosure.

FIG. 9 illustrates an example method 500 of implementing downhole equipment with an acoustic feature in a well. Beginning with operation 505, downhole equipment having an acoustic feature is placed in a wellbore. As the downhole equipment operates, the acoustic feature can generate acoustic signals and, in operation 510, one or more acoustic sensors in the well detect the acoustic signals. The acoustic signals can provide an indication of the operation or performance of the downhole equipment. In operation 515, the acoustic sensor transmits the detected acoustic signals to a control system located at a surface of the wellsite. In some case, an alert system can receive the transmitted acoustic signals. In operation 520, the control system can process the received acoustic signals and make a determination regarding the operation of the downhole equipment. For example, the acoustic signals may indicate that the downhole equipment was not or is not operating properly or may indicate that certain downhole equipment should be operated differently to optimize the performance of the well. Alternatively, if an alert system generates an alert from the transmitted acoustic signal, personnel operating the well can determine a course of action. In operation 525, in response to the determination, the control system can transmit a control signal to the downhole equipment. Alternatively, the personnel operating the well can take an action such as actuating equipment. Lastly, in operation 530, responsive to receiving the control signal or the physical action from the actuated equipment, the operation of the downhole equipment is modified to change or improve the performance of the well.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" may be used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

For purposes of the foregoing description and the claims, unless otherwise indicated, all numbers expressing quantities, percentages or proportions, and other numerical values are to be understood as being modified in all instances by the term "about." Accordingly, unless indicated to the contrary, the numerical parameters set forth in the following specification and attached claims are approximations that can vary depending upon the desired properties sought to be obtained by the descriptions herein.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A well system comprising:
a tubing string disposed in a wellbore;
an acoustic sensor disposed in the wellbore adjacent to the tubing string; and
a flow control valve disposed in the wellbore and surrounding a portion of the tubing string, the flow control valve comprising a housing, a sliding sleeve, and an acoustic feature disposed on one or both of the housing and the sliding sleeve, wherein when the sliding sleeve moves from a first position to a second position the movement of the sliding sleeve engages a protrusion of the acoustic feature causing the acoustic feature to emit an acoustic signal, the acoustic signal detectable by the acoustic sensor.

2. The well system of claim 1, further comprising:
a second flow control valve disposed in the wellbore and surrounding a portion of the tubing string at a second position, the second flow control valve comprising a second housing, a second sliding sleeve, and a second acoustic feature disposed on one or both of the second housing and the second sliding sleeve, wherein when the second sliding sleeve moves from a third position to a fourth position the second acoustic feature emits a second acoustic signal, the second acoustic signal detectable by the acoustic senor.

3. The well system of claim 2, wherein the acoustic signal is different from the second acoustic signal.

4. The well system of claim 2,
wherein the acoustic feature comprises the protrusion and a notch, and
wherein the second acoustic feature comprises a plurality of protrusions and a plurality of notches.

5. The well system of claim 2, wherein the acoustic signal indicates the flow control valve has actuated and wherein the second acoustic signal indicates the second flow control valve has actuated.

6. The well system of claim 1, wherein the acoustic sensor is a microphone or a fiber optic acoustic sensor or any other means with which to detect an acoustic signal.

7. The well system of claim 1, wherein the acoustic feature comprises the protrusion and a notch.

8. The well system of claim 1, wherein the acoustic signal indicates the flow control valve has actuated.

9. A method of managing a well system, the method comprising,
placing downhole equipment in a wellbore of the well system, the downhole equipment comprising an acoustic sensor and a flow control valve, the flow control valve comprising a housing, a sliding sleeve, and an acoustic feature on one or both of the housing and the sliding sleeve;
detecting with the acoustic sensor an acoustic signal emitted by the acoustic feature when the sliding sleeve moves from a first position to a second position and the movement of the sliding sleeve engages a protrusion of the acoustic feature causing the acoustic feature to emit the acoustic signal;
transmitting, by the acoustic sensor, the acoustic signal to a control system;
determining, by the control system, an operating parameter of the downhole equipment based upon the acoustic signal; and
transmitting, by the control system, responsive to determining the operating parameter, a control signal that modifies an operation of the well system.

10. The method of claim 9, wherein the control signal modifies an operation of the downhole equipment.

11. The method of claim 9, wherein the acoustic feature comprises the protrusion and a notch.

12. The method of claim 9, wherein the acoustic signal indicates the flow control valve has actuated.

* * * * *